(12) United States Patent  (10) Patent No.: US 6,214,280 B1
Delmoro  (45) Date of Patent: Apr. 10, 2001

(54) POST-CURE INFLATOR AND METHOD

(75) Inventor: Richard L. Delmoro, Tallmadge, OH (US)

(73) Assignee: Akron Special Machinery, Inc., Akron, OH (US)

( * ) Notice: Subject to any disclaimer, the term of this patent is extended or adjusted under 35 U.S.C. 154(b) by 0 days.

(21) Appl. No.: 09/259,384

(22) Filed: Feb. 26, 1999

(51) Int. Cl.$^7$ ................................................ B29C 35/16
(52) U.S. Cl. ................................. 264/502; 425/58.1
(58) Field of Search ............................. 435/28.1, 34.1, 435/58.1; 264/502

(56) References Cited

U.S. PATENT DOCUMENTS 3,529,048 * 9/1970 Kovac et al. ................... 425/34.1

* cited by examiner

Primary Examiner—James P. Mackey
(74) Attorney, Agent, or Firm—Reese Taylor

(57) ABSTRACT

A post-cure inflator for tires includes a driven shaft for mounting at least one tire chuck for receiving the tire bead and at least one spindle for mounting a tire chuck and being disposed in opposed relationship with the driven shaft. The at least one spindle is movable toward and away from the driven shaft. A tire support shaft is also provided to receive a tire and elevate it into registry to permit mounting of the tire on the chucks. The driven shaft can be provided with opposed ends carrying the chucks and a spindle and chuck may be positioned opposite both ends. The method includes mounting the tire on a rotatable spindle which is disposed in a horizontal plane so that the tire is disposed in a vertical plane, inflating the tire and rotating it in the post-curing operation.

11 Claims, 5 Drawing Sheets

POST-CURE INFLATOR AND METHOD

RELATED PATENT APPLICATIONS

None.

FIELD OF THE INVENTION

This invention relates in general to the manufacture of pneumatic tires and relates in particular to a post inflator for said tires to be used in conjunction with a curing press to post inflate the tires in a vertical mode following curing.

BACKGROUND OF THE INVENTION

It is well known in the tire manufacturing industry to "post inflate" tires following curing. As the warm tires are removed from the curing press, they are chucked onto a suitable sized chucking apparatus and inflated during the cooling period. They are then removed and moved on to further processing stations.

Heretofore in the prior art, the tires have generally been positioned horizontally, that is with their sidewalls parallel to the ground, floor or other surface supporting the machine. The tires are then "hung" in this position for a fixed period of time following which they are reversed or turned over and permitted to hang for a similar suitable period of time in that mode following which they are removed and moved on to a further processing station.

The difficulty is that these tires are very hot when removed from the curing press having been cured at a temperature in the range of from about 280° F. to 400° F. Positioning the tires in a horizontal mode during the post-cure operation results in deformation of the tire in many instances because of the tendency of the sidewalls to sag due to gravitational forces.

Accordingly, it is believed desirable to provide an apparatus and method for avoiding this deformation while still accomplishing the basic post-cure inflation process.

SUMMARY OF THE INVENTION

It has been found that the post-cure inflation operation can be facilitated and improved by mounting the tires in a vertical position during the operation such that the tread area of the tire is substantially parallel to the ground or supporting surface. In this way, deformation of the tire can be avoided as the tire cools.

It has further been found that rotating the tire during this operation will facilitate the post-cure operation so as to speed up the operation and facilitate continuous production.

In furtherance of this objective, it has been found that a frame with at least one driven shaft and one free-wheeling shaft carried thereon and mounted in opposed coaxial condition can be used to carry rim-engaging chucks so that the tires may be mounted, inflated and rotated during the post-curing process so that tires may be cooled and rotated during the post-curing cycle.

It has also been found that an apparatus for achieving the above-noted objects can be improved if mounted so as to be portable or movable from position to position so that it can be selectively located adjacent to the curing press or presses.

Accordingly, production of an improved post-cure inflator and method of the character above described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
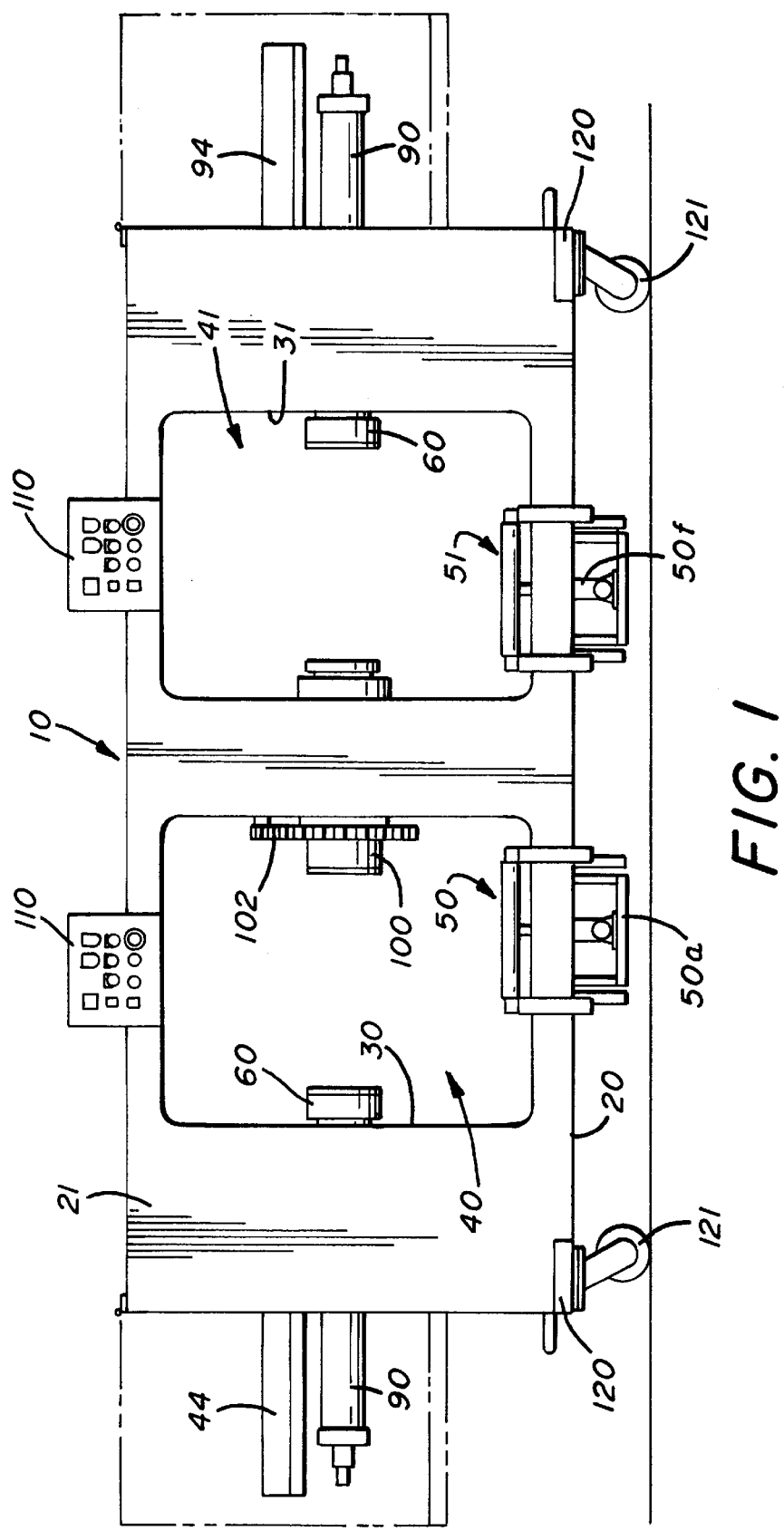
FIG. 1 is a side elevational view showing the improved assembly without tires.
Figure 2:
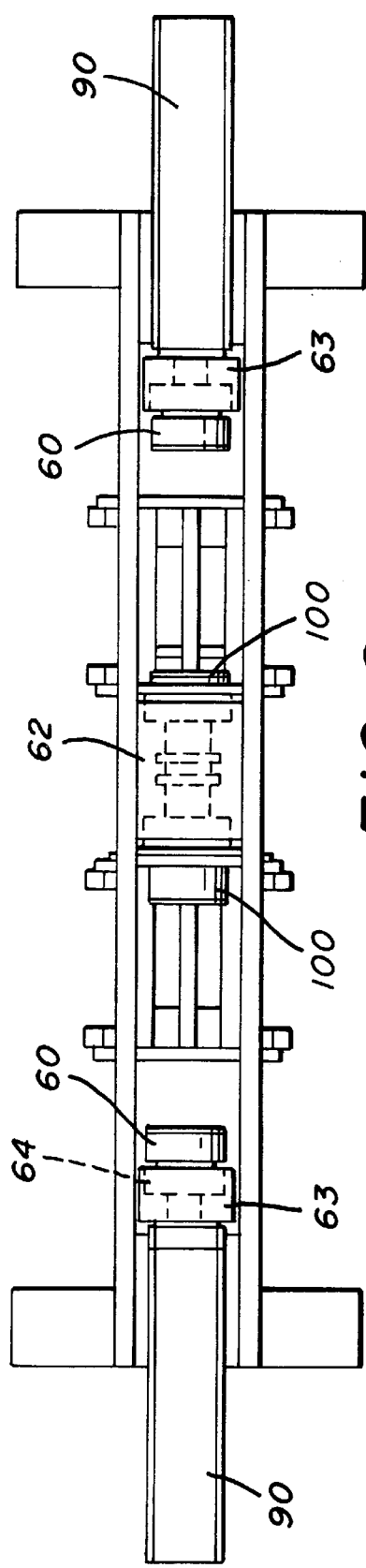
FIG. 2 is a top plan view of the apparatus of FIG. 1.
Figure 4:
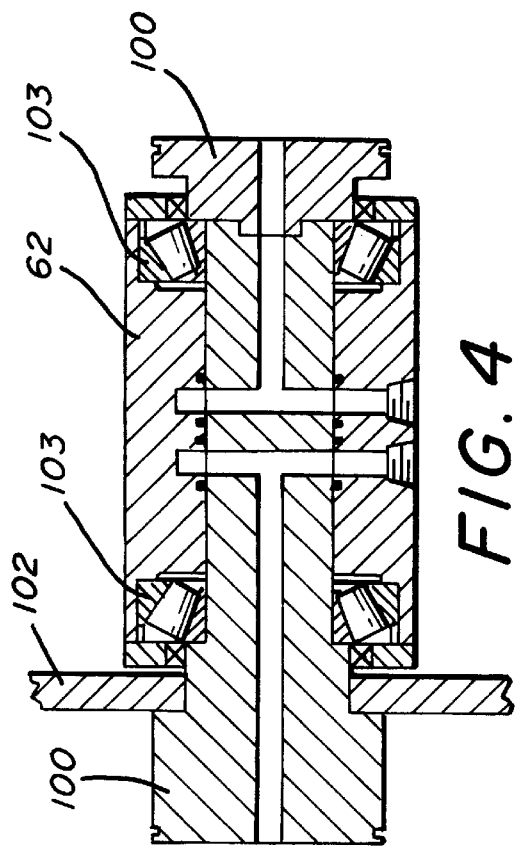
FIG. 4 is a view of the driven shaft upon which one of the chucks for the tire is mounted.

Referring first to FIG. 1 of the drawings, it will be seen that the post-cure inflator, generally indicated by the numeral 10, includes a base 20 and a pair of opposed side plates 21,21 joined together at the top edges by a top plate 22 and by a similar bottom plate.

These plates form a generally box-shaped enclosure and have side openings 30 and 31 to form chambers 40 and 41 for receipt of the tire and the chucking apparatus.

Also projecting upwardly, from the bottom of post-cure inflator 10, between the side plates 21,21 are tire positioning means, one for each of the chambers 40 and 41. These means are generally indicated by the numerals 50 and 51 in the drawings and are identical so that only one will be described.

Figure 3:
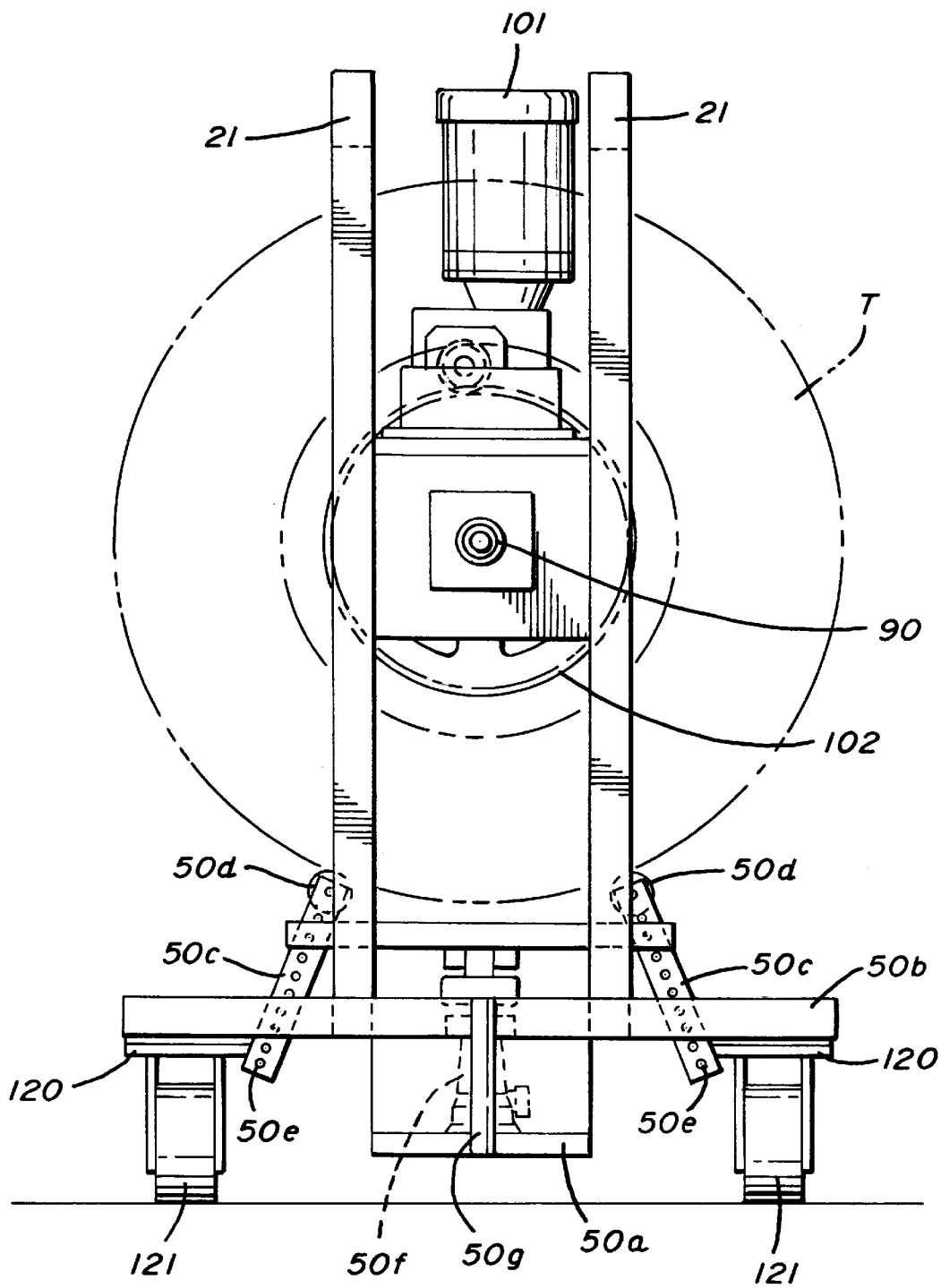
FIG. 3 is a sectional view of the apparatus for positioning the tire in the post inflating apparatus and is a sectional view taken along the lines 3—3 of FIG. 1.

As can be seen in FIG. 3, in that regard, the tire positioning device 50 includes a lift support 50a, a lift frame 50b and adjustable roller supports 50c,50c. These roller supports 50c,50c carry conveyor rollers 50d,50d on their projecting ends.

It will be noted that these members 50c,50c also have a plurality of perforations 50e,50e in them and these are intended to provide for adjustment of the members 50c,50c relative to the support plate 50b. In that way, the extent to which the rollers 50d,50d project can be adjusted to accommodate various tires diameters.

Also mounted on the lift support 50a is a double screw jack 50f and an air cylinder 50g. This jack may be adjusted so as to control the degree to which the plate 50b projects above the support plate or lift support 50a when cylinder 50g is activated to raise.

Referring again then to FIGS. 1, 2, 4, 5 and 5A, it will be seen that each chamber 40 and 41 receives a free-wheeling spindle 60. In FIG. 1 of the drawings, the spindle 60 is shown as merely being a spindle, while in FIGS. 5 and 5A, a tire chuck 70 is shown as being removably attached to the projecting end of the spindle. This chuck 70, of course, is intended to engage the bead area of the tire, as can be clearly seen, for example, in FIGS. 5 and 5A.

The spindle 60 is mounted on and journaled to a shaft 62 and bearing housing 63 surrounds the bearing 64 so that the shaft which carries the spindle 60 is free to rotate.

The spindle 60 is moved into and out of the chambers 40 and 41 by means of a cylinder 90 which is carried by a cylinder support 91 which is, in turn, secured to a bearing 92 which rides on a rail 93, with the rail 93 being carried by the rail support 94. In this fashion, the chuck can move in and out of the chamber, as can be seen, for example, by comparing FIGS. 5 and 5A of the drawings.

Centrally mounted within the housing is a driven center shaft 100. This shaft is connected to a speed reducer 101 and driven by a gear 102. The shaft 100 is journaled in a bearing 103. It will be understood and is clear from the drawings that, in the form of the invention illustrated herein, the center shaft is double ended with opposed ends projecting into each of the chambers 40 and 41. Also, again as shown in FIG. 1 of the drawings, for example, the center shaft end is merely shown projecting into the chamber. As can be seen, however, in FIGS. 5 and 5A, the center shaft carries a tire chuck 70 which engages the opposite bead of the tire, as clearly shown in the drawings.

It will be understood that the center shaft 100 is continuously rotating regardless of whether a tire is received on the chuck or not, although, of course, the speed of rotation can be controlled by the control panels 110,110.

In use or operation of the improved post-cure inflator, a tire will be placed on the conveyor rollers 50d,50d and it will be assumed that the suitable adjustments will have been made prior to that to the tire support means 50,51 so that different sizes of tires can be accommodated. It will be obvious that, depending on the tire diameter, a greater or lower degree of movement will be required by the tire support member to bring the tire beads up into alignment with the chucks 70,70.

Once the suitable adjustments have been made and a tire T is placed on the conveyor rolls, it is simply necessary to elevate the tire support member to bring the tire beads into alignment with the chucks, following which the spindle 60 will be advanced into the appropriate chamber and engage the beads, with the opposed bead, of course, being engaged on the chuck 70 carried by center shaft 100. During the seating operation, center shaft 100 may be slowed down to facilitate seating of the beads. Once seated, the tire T may be inflated from air source 130 through bore 101 through the hollow shaft 62 in known fashion and the center shaft 100 speeded up to the desired speed.

The tire support means 50,51 will have been retracted out of the way and this will permit the inflated tire to be rotated for the desired length of time, following which the process will be reversed in that the tire support means will again be elevated to engage the tread of the tire and the spindle 60 will be withdrawn so that the finished tire can be removed and another one inserted.

Figure 5:
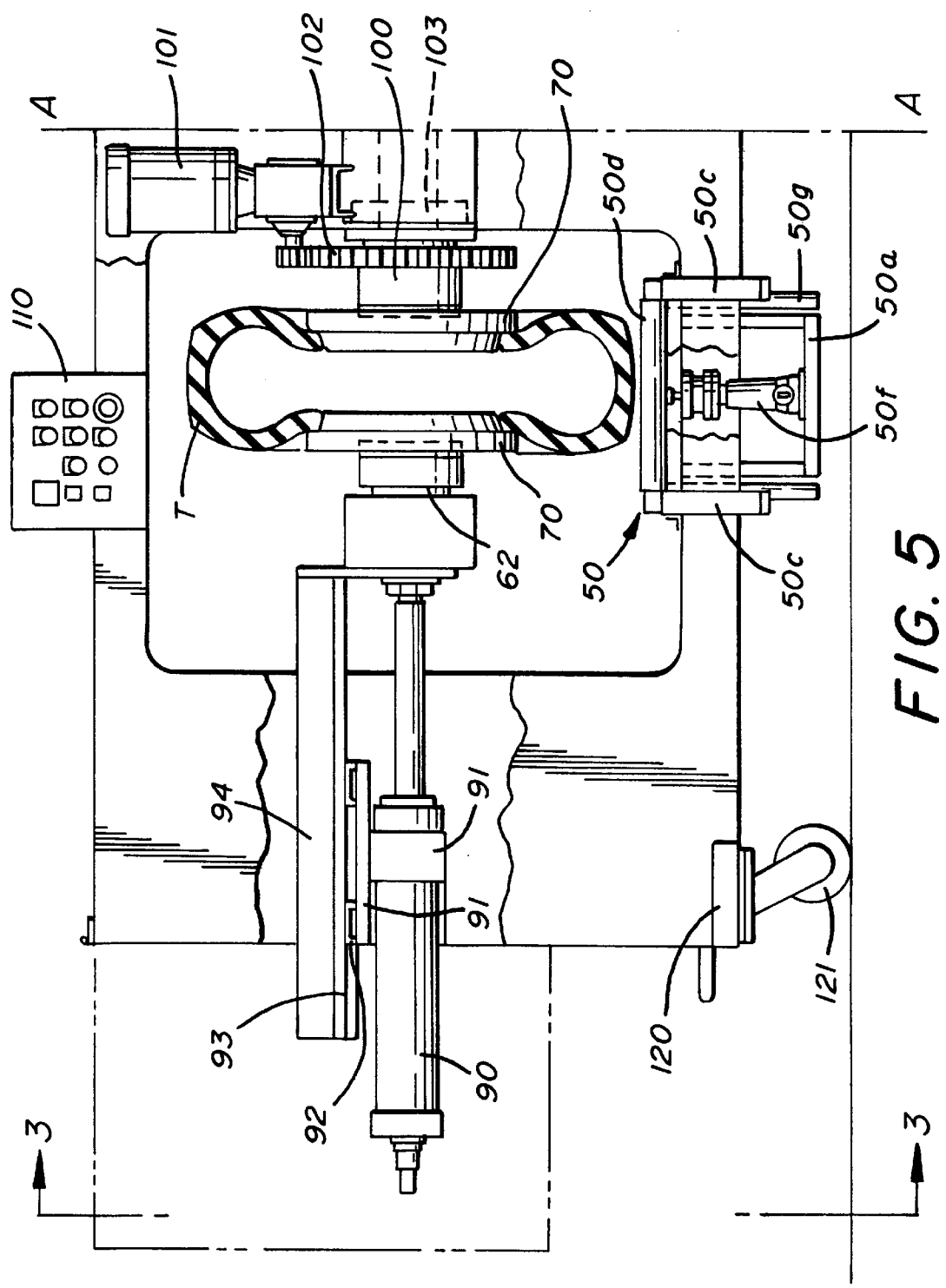
FIGS. 5 and 5A are elevational views, partially broken away, showing one tire in place and one tire being put in place.
Figure 5A:
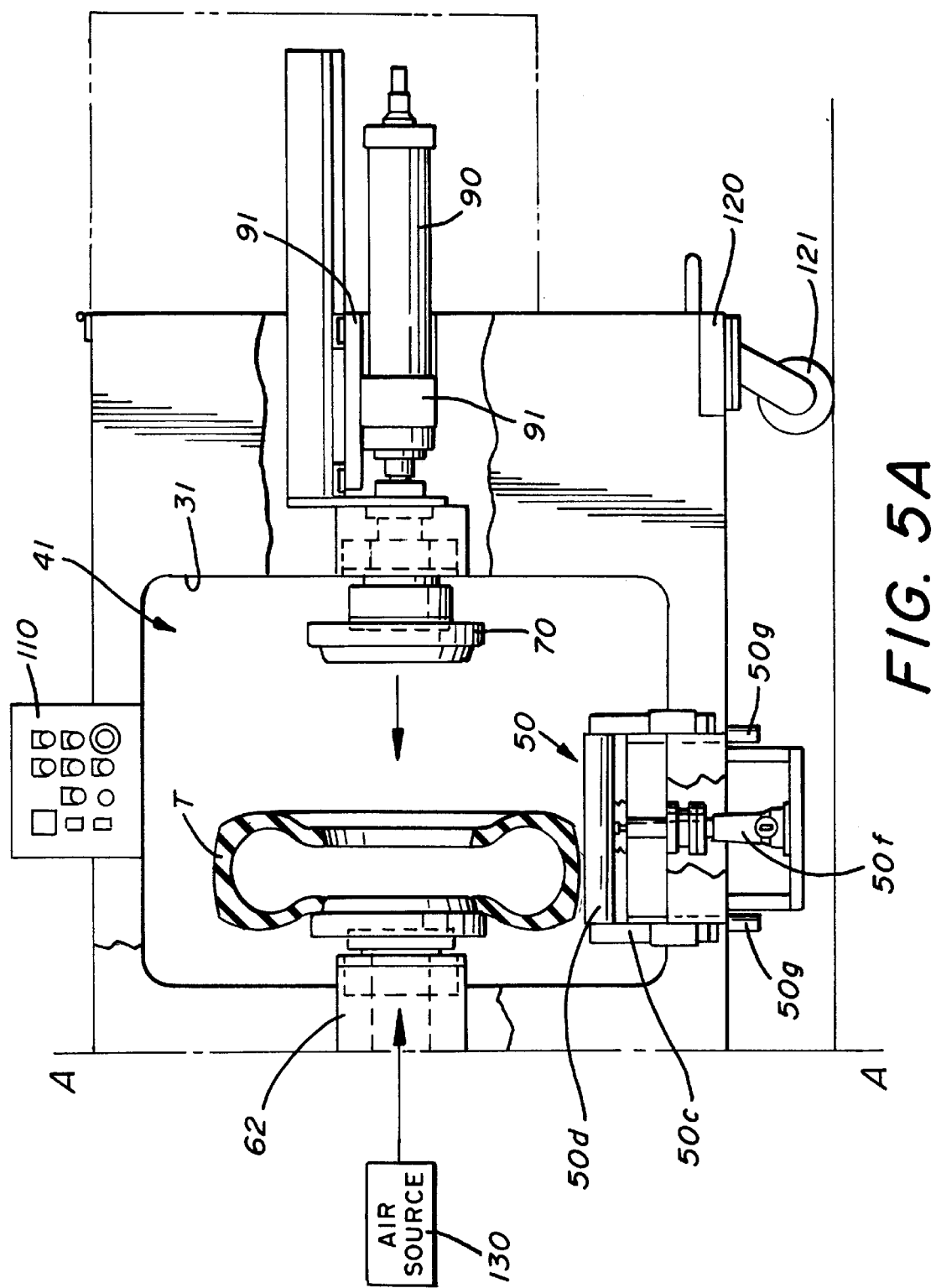

As is clear from reviewing FIGS. 5 and 5A of the drawings, the double chamber arrangement makes it possible to be completing the operation on one tire while another tire is being loaded.

In this way, the deformation of the tire, which, it will be noted, is suspended in its normal operating posture during this operation, can be avoided in contrast to the horizontal mounting or disposition of the tire in the prior art.

It will be understood that the post-cure inflator of the present invention can be mounted directly on the floor in which event the base plate 20 would simply rest on a floor surface. Alternatively, the device can be made portable by the employment of a caster support 120 secured or otherwise attached to the bottom plate 20 and a caster 121. Four of these casters, one at each corner of the housing, would be employed. In that way, it is possible to associate and locate the post-cure inflator with any desired curing press, giving the operator flexibility.

While a full and complete description of the invention has been set forth in accordance with the dictates of the patent statutes, it should be understood that modifications can be resorted to without departing from the spirit hereof or the scope of the appended claims.

What is claimed is:

1. A post-cure inflator for tires, comprising:
   (a) a frame having
      (1) an elongate base,
      (2) opposed side plates projecting upwardly from said base, and
      (3) a pair of access openings disposed in said side plates to form chambers for receipt of the tires;
   (b) a driven shaft disposed centrally of said frame with its opposed ends projecting into said chambers and adapted to receive a tire chuck;
   (c) a pair of spindles carried by said frame and projecting into said chambers in opposed relationship with said driven shaft and adapted to receive a tire chuck;
   (d) said spindles being movable toward and away from said driven shaft; and
   (e) tire support assemblies carried by said base of said frame and projecting into each of said chambers beneath said driven shaft and said spindles.

2. The post-cure inflator of claim 1 wherein said tire support assemblies are movable into and out of said chambers.

3. The post-cure inflator of claim 1 wherein said tire support assemblies are adjustable with regard to the extent of movement into said chambers.

4. The post-cure inflator of claim 1 wherein said frame is movable.

5. The post-cure inflator of claim 1 wherein said spindles are hollow.

6. A post-cure inflator for tires, comprising;
   (a) a frame having
      (1) an elongate base,
      (2) opposed side plates projecting upwardly from said base, and
      (3) an access opening disposed in said side plates to form a chamber for receipt of the tires;
   (b) a driven shaft carried by said frame with one end projecting into said chamber and adapted to receive a tire chuck;
   (c) a spindle carried by said frame and projecting into said chamber in opposed relationship with said driven shaft and adapted to receive a tire chuck;
   (d) said spindle being movable toward and away from said driven shaft; and
   (e) a tire support assembly carried by said base of said frame and projecting into said chamber beneath said driven shaft and said spindle.

7. The post-cure inflator of claim 6 wherein said tire support assembly is movable into and out of said chamber.

8. The post-cure inflator of claim 6 wherein said tire support assembly is adjustable with regard to the extent of movement into said chamber.

9. The post-cure inflator of claim 6 wherein said frame is movable.

10. The post-cure inflator of claim 6 wherein said spindle is hollow.

11. A method for post-curing tires, comprising the steps of:
   a) mounting a first tire on one end of a first rotatable spindle which is disposed in a horizontal plane;
   b) moving said tire and said first spindle into engagement with a first chuck carried on one end of a driven shaft;
   c) inflating the first tire;
   d) rotating the first tire for a predetermined period of time at a predetermined rate;
   e) retracting and dismounting and removing the first tire while repeating steps a)–e) with respect to a second tire mounted on the end of a second spindle movable into engagement with a second chuck carried by the opposed end of said driven shaft; and
   f) retracting, dismounting and removing the second tire.

* * * * *